US006886683B1

(12) United States Patent
Kakiuchi et al.

(10) Patent No.: US 6,886,683 B1
(45) Date of Patent: May 3, 2005

(54) CONVEYING APPARATUS, INSPECTING APPARATUS AND ALIGNINGLY AND SUPPLYING APPARATUS

(75) Inventors: Shogo Kakiuchi, Kobe (JP); Koji Tsutsumi, Kawanishi (JP)

(73) Assignee: Kanebo, Ltd., Tokyo (JP)

(*) Notice: Subject to any disclaimer, the term of this patent is extended or adjusted under 35 U.S.C. 154(b) by 0 days.

(21) Appl. No.: 10/089,598

(22) PCT Filed: Sep. 29, 2000

(86) PCT No.: PCT/JP00/06756

§ 371 (c)(1),
(2), (4) Date: Jul. 1, 2002

(87) PCT Pub. No.: WO01/23110

PCT Pub. Date: Apr. 5, 2001

(30) Foreign Application Priority Data

Sep. 30, 1999 (JP) .......................................... 11-278595

(51) Int. Cl.⁷ ........................ B65G 13/02; B65G 15/42; B65G 17/46; B65G 25/00; B65G 29/00
(52) U.S. Cl. .................................... 198/689.1; 198/393
(58) Field of Search ............................... 198/391, 393, 198/397, 626.1, 626.2, 689.1

(56) References Cited

U.S. PATENT DOCUMENTS

| | | | |
|---|---|---|---|
| 3,722,658 A | | 3/1973 | Sterlng |
| 4,167,226 A | * | 9/1979 | Ackley et al. ......... 198/397.04 |
| 4,353,456 A | * | 10/1982 | Yamamoto ............ 198/397.04 |
| 4,393,973 A | * | 7/1983 | Ackley et al. .............. 198/384 |
| 4,632,028 A | * | 12/1986 | Ackley ........................ 198/393 |
| 4,757,382 A | | 7/1988 | Kaziura et al. |
| 4,934,560 A | | 6/1990 | Bouyer |
| 5,531,312 A | | 7/1996 | Dickey |
| 5,878,868 A | | 3/1999 | Gotoh et al. |

FOREIGN PATENT DOCUMENTS

| | | |
|---|---|---|
| EP | 0166277 A2 | 1/1986 |
| EP | 0715164 A2 | 6/1995 |
| EP | 0715164 A3 | 6/1997 |
| FR | 2539057 A1 | 7/1984 |
| JP | 60-72418 | 5/1985 |
| JP | 63-106225 | 5/1988 |
| JP | 10170446 | 6/1998 |
| JP | 10-170446 | 6/1998 |

OTHER PUBLICATIONS

European Search Report for Application No. EP 00962968 dated Nov. 06, 2002.
European Search Report for Application No. EP 00962968 dated Feb. 20, 2003.
Japanese Office Action and English translation for Application No. 278595.

* cited by examiner

Primary Examiner—Gene O. Crawford
(74) Attorney, Agent, or Firm—Hogan & Hartson, LLP

(57) ABSTRACT

A conveying apparatus is provided with a rotary disc portion with a suction means which forms a slit on an outer peripheral surface and sucks through the slit so as to convey a conveyed article in a state of holding the conveyed article by suction to both sides of the slit, and a linear conveying portion with a suction means which sucks the conveyed article riding over a pair of parallel conveying belts through a gap between the conveying belts so as to convey the conveyed article in a state of holding the conveyed article by suction to the conveying belt, and has one end opposing to the outer peripheral surface of the rotary disc portion so as to be capable of transfer the conveyed article. The conveying apparatus of the invention, the inspecting apparatus and an aligning and supplying apparatus allow for execution of a side surface inspection of a small article stably without requiring a lot of space.

38 Claims, 10 Drawing Sheets

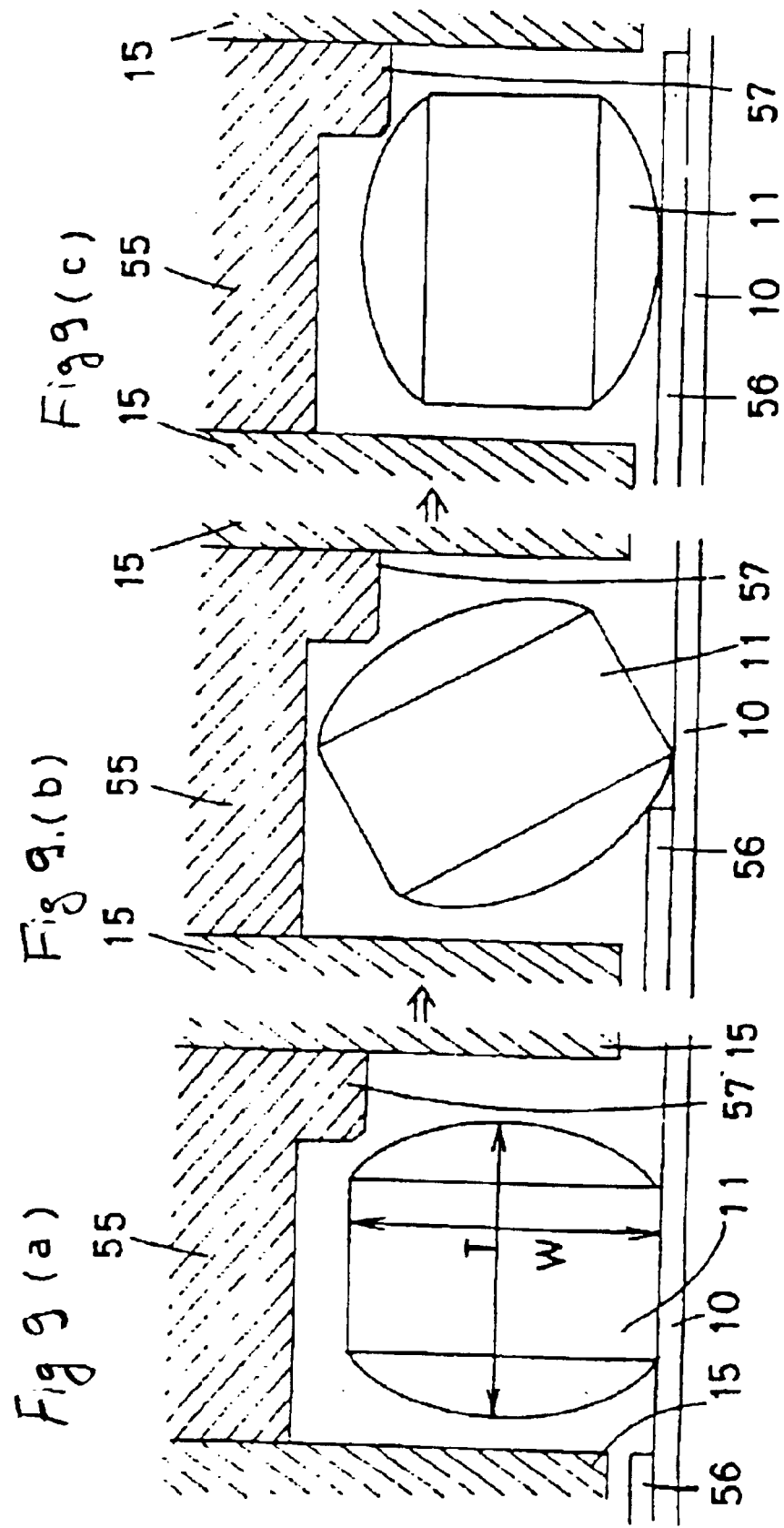

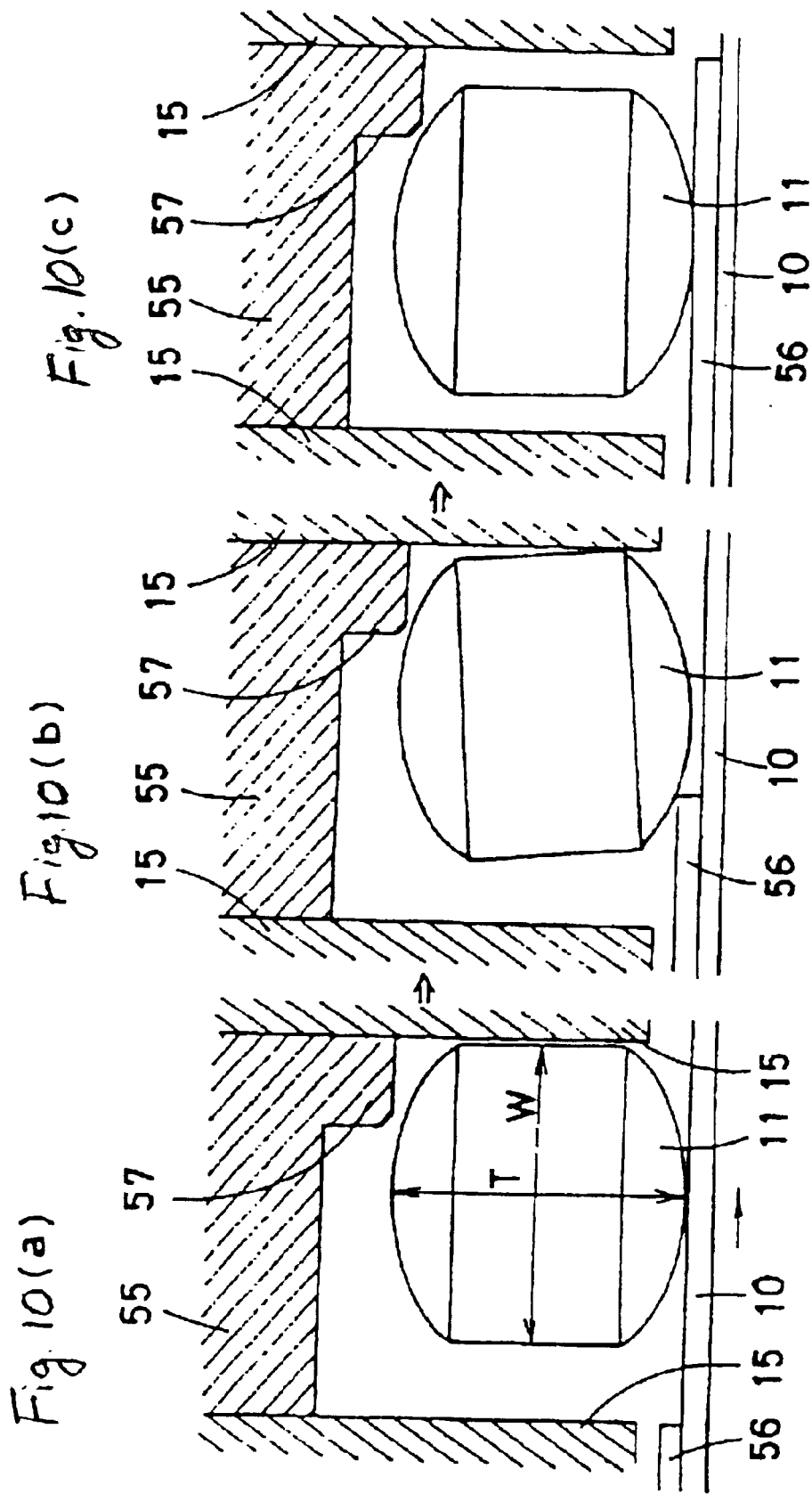

US 6,886,683 B1

CONVEYING APPARATUS, INSPECTING APPARATUS AND ALIGNINGLY AND SUPPLYING APPARATUS

BACKGROUND OF THE INVENTION

1. Technical Field

The present invention relates to a conveying apparatus for an article to be inspected by an inspecting apparatus for small articles such as medicine in the form of tablets, capsules, etc., small confectionery such as a candy and the like, a washer, a battery cell, or the like, in a defect inspection process, a visual inspection process, a dimensional check process or the like.

2. Background Art

When inspecting surfaces of articles such as the small articles conveyed using a conveying apparatus, a plurality of conveying apparatuses formed in a linear direction have been conventionally arranged in series so as to easily transfer the article from one conveying apparatus to another conveying apparatus. However, this requires a lot of space to accommodate the linear conveying apparatuses. Alternatively, when positioning the conveying apparatus in a vertical direction, the linear space required to accommodate the apparatus is reduced but the height required to accommodate the conveying apparatus increases. As such, a conveyed article held by suctioning sometimes vibrates more a higher elevations and this makes it difficult to properly inspect these articles.

Further, the linear conveying apparatus is designed with a pair of parallel belts on which the article is placed and suction device for holding the article in place. If the diameter of the belts increase and a small article is conveyed, the side surfaces of these articles cannot be properly inspected because the side surfaces are covered by the belts.

Further, another type of conveying apparatus is the conventional type rotary disc apparatus. The rotary disc apparatus includes a contact portion made of an aluminum metal or the like, which comes into contact with the article. The contact portion has a low coefficient of friction which causes the article to slip, whereby the conveying of the article is easily displaced by its own weight.

Further, this kind of structure (for example, Japanese Patent Application Laid-Open No. 61-212374) is provided with movable opposing plates. A slit is provided between the plates with the gap small enough to prevent the article from falling between the plates. A suctioning device having a rotary tube shaft concentrically pierced in an inner side of the movable opposing plates, communicates with an inner portion of the rotary tube shaft and sucks air from the slit to an inner side of the movable opposing plates. However, since the rotary tube shaft is provided, the air is unnecessarily sucked from the slit corresponding to a portion requiring no suction.

Further, the conveyed article proceeds to the conveying apparatus, the aligning and supplying apparatus is used. The conventional aligning and supplying apparatus is structured such that the conveyed article supplied on a turn table is exposed to an aligning operation of an aligning guide together with a rotation of the turn table, and is gradually aligned along a peripheral wall. The conveyed article reaching a thickness gate from the aligning guide is sorted on the border of a predetermined thickness, and the conveyed article having a thickness equal to or less than the thickness passes through the thickness gate so as to reach a width guide. The conveyed article reaching the width guide is sorted on the border of a predetermined width, and the conveyed article having a width equal to or less than the width passes through the width guide so as to be fed out to the conveying apparatus.

However, the article having the different width and thickness and being stable in a state of turning at 90 degrees, such as the tablet or the like is sorted at the thickness gate. The more a rate of the 90 degrees turn becomes, the more a number or an amount thereof sorted by the thickness gate becomes, whereby the number of the conveyed article fed out to the conveying apparatus is reduced. Accordingly, a processing efficiency is significantly deteriorated.

Accordingly, the present invention provides a conveying apparatus which can execute a side surface inspection of a small article without requiring a lot of space, execute an inspection in a rotary disc apparatus and shut out an air in a portion requiring no suction.

Further, present invention provides an aligning and supplying apparatus which can improve the processing efficiency even with small articles having different widths and thicknesses.

SUMMARY OF THE INVENTION

In accordance with a first aspect of the present invention, there is provided a conveying apparatus including a rotary disc portion having a pair of parallel plate members with a region defined there between. A gap is formed on one side of the region between the pair of parallel plate members. A first suctioning device is disposed on an outer surface of the pair of parallel plate members to secure an article on the outer peripheral surfaces of the pair of parallel plate members by extracting air from the gap. A linear conveying portion is provided having a pair of parallel conveying belts with a gap formed there between. The linear conveying portion being is in communication with the rotary disc portion to transfer the article from the rotary disc portion to the linear conveying portion.

In accordance with the conveying apparatus described in the first aspect of the present invention, since the apparatus includes the rotary disc portion and the linear conveying portion, it is possible to stably convey without requiring a lot of space even when the linear conveying portion is arranged horizontally, and further it is possible to execute a side surface inspection of the conveyed article conveyed in the rotary disc.

In accordance with a second aspect of the present invention, there is provided a conveying apparatus as described in the first aspect, wherein a ring-like supporting member having a high friction coefficient is provided in both sides of the slit along the outer peripheral surface of the rotary disc.

In accordance with the conveying apparatus described in the second aspect of the present invention, in addition to the same effect as that of the first aspect, it is possible to fix the supporting member to the peripheral edge of the rotary disc portion being different from the conveying belt in the linear conveying portion and it is possible to make a cross sectional area of the supporting member small, so that it is possible to stably inspect the conveyed article without working against the side surface inspection of the conveyed article and without slipping the conveyed article. In particular, when the supporting member is constituted by a structure having a buffering property and an adhesive property, for example, an O-ring, it is possible to convey at a high speed and stably.

In accordance with a third aspect of the present invention, there is provided a conveying apparatus as described in the second aspect, wherein the linear conveying portion is constituted by a first conveying portion and a second conveying portion having the same structure, one end of the first conveying portion opposes to the outer peripheral surface of the rotary disc portion so as to be capable of transferring the conveyed article, and one end of the second conveying portion opposes to another end of the first conveying portion so as to be capable of transferring the conveyed article.

In accordance with the conveying apparatus described in the third aspect, in addition to the same effect as that of the second aspect, it is possible to inspect both the front and back surfaces of the conveyed article by the linear conveying portion.

In accordance with a fourth aspect of the present invention, there is provided a conveying apparatus as described in the third aspect, further includes an aligning and supplying apparatus for aligning the conveyed article so as to supply to the outer peripheral surface of the rotary disc portion in an opposite side to the first conveying portion of the rotary disc portion, and an air shutting device for closing the slit of the peripheral surface portion other than the peripheral surface portion reaching the first conveying portion from the aligning and supplying apparatus in a rotational direction of the rotary disc portion.

In accordance with the conveying apparatus described in the fourth aspect, in addition to the same effect as that of the third aspect, it is possible to shut the air of the slit requiring no suction in the rotary disc. Accordingly, it is possible to save the amount of air suctioning, the capacity of air blower and the amount of energy used.

In accordance with a fifth aspect of the present invention, there is provided an inspecting apparatus using the conveying apparatus described in the first aspect, the second aspect, the third aspect or the fourth aspect, including a side surface inspecting portion for inspecting a side surface of the conveyed article on the rotary disc portion; a front surface inspecting portion for inspecting the front surface of the conveyed article on the first conveying portion; a back surface inspecting portion for inspecting the back surface of the conveyed article on the second conveying portion; and a sorting portion for sorting the conveyed article in response to an inspected result.

In accordance with the inspecting apparatus described in the fifth aspect, in addition to the same effects as that of the first aspect, the second aspect, the third aspect or the fourth aspect, it is possible to inspect the side surface and both the front and back surfaces of the conveyed article, and it is possible to sort in response to an inspected result.

In accordance with a sixth aspect of the present invention, there is provided an aligning and supplying apparatus for mounting a conveyed article having different thickness and width and capable of being stably mounted by setting a thickness direction or a width direction to a vertical direction, respectively, including a turn table in which a step portion having a predetermined height is provided along a peripheral edge of a mounting surface; a width guide crossing to the step portion in such a manner as to guide the conveyed article mounted on the mounting surface from a center side to an outer peripheral side due to a rotation of the turn table, having one end positioned at the center side of the turn table rather than the step portion and having another end protruding outward from the outer periphery of the step portion so as to be fixed; and a thickness gate arranged in an upper side of the conveyed article passing within the width guide on the turn table, and having a projection portion protruding toward the conveyed article so as to be capable of getting down the conveyed article in a high attitude on the step portion without getting down the conveyed article in a low attitude at a time when the conveyed article moving along the width guide due to the rotation of the turn table rides over the step portion.

In accordance with the aligning and supplying apparatus described in the sixth aspect, it is possible to align all the small articles having the different width and thickness and stabilizing under the turned state in a low attitude, and it is not necessary to sort, so that it is possible to improve a processing efficiency.

BRIEF DESCRIPTION OF THE DRAWINGS

FIG. 9A is a cross sectional view along a line A—A in FIG. 7 in the case that a conveyed article has a high attitude;

FIG. 9B is a cross sectional view along a line B—B in FIG. 7;

FIG. 9C is a cross sectional view along a line C—C in FIG. 7;

FIG. 10A is a cross sectional view along a line A—A in FIG. 7 in the case that a conveyed article has a low attitude;

FIG. 10B is a cross sectional view along a line B—B in FIG. 7; and

FIG. 10C is a cross sectional view along a line C—C in FIG. 7.

DETAILED DESCRIPTION OF THE PREFERRED EMBODIMENTS

Figure 1:
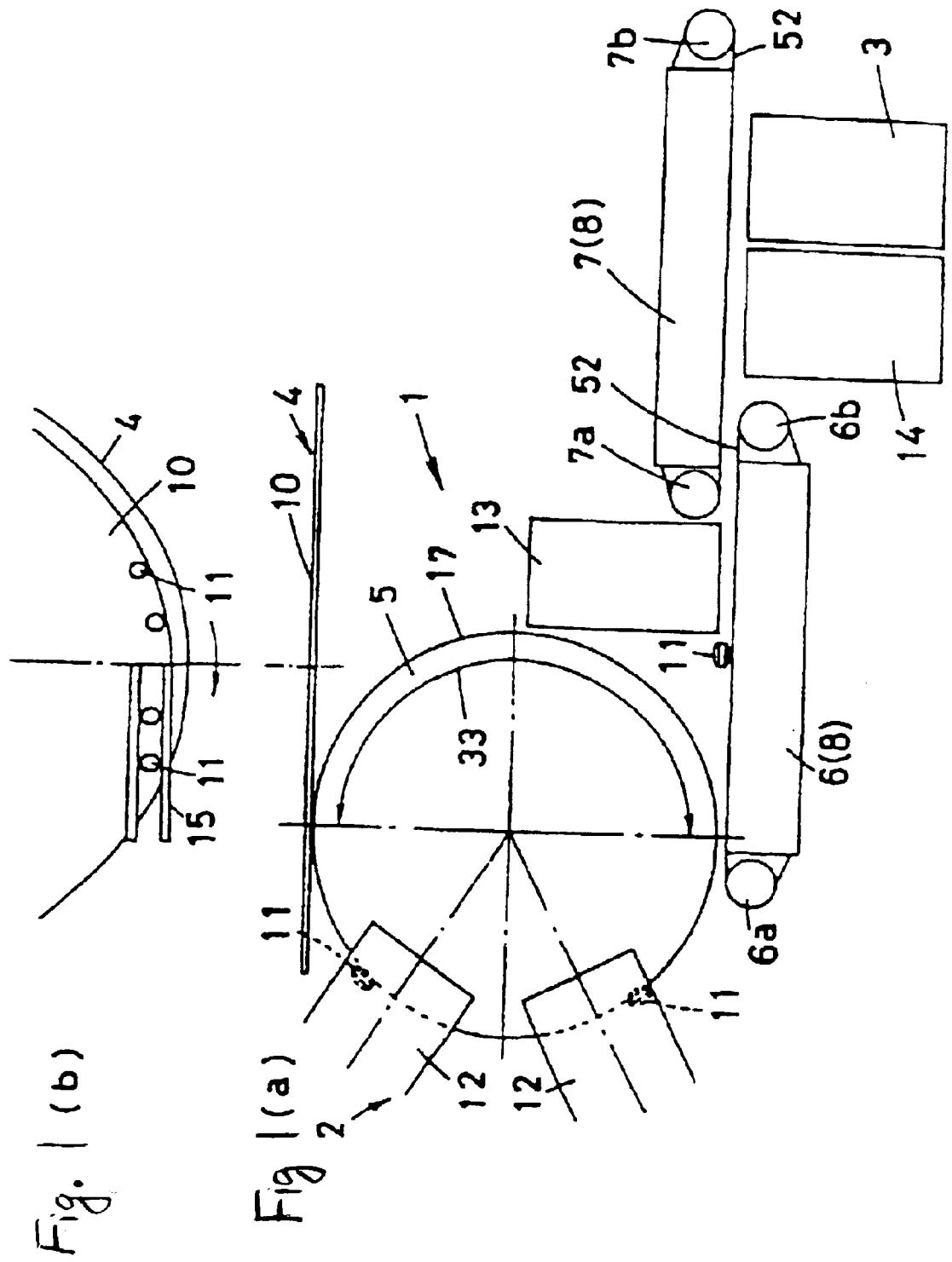
FIG. 1 is a schematic view of an embodiment in accordance with the present invention.

A description will be given of an embodiment in accordance with the present invention with reference to FIGS. 1 to 10. FIG. 1 shows an inspecting apparatus, which has a conveying apparatus 1, an inspection portion 2 and a sorting portion 3. The conveying apparatus 1 has an aligning and supplying apparatus 4, a rotary disc portion 5, a first conveying portion 6 and a second conveying portion 7. The first conveying portion 6 and the second conveying portion 7 form a linear conveying portion 8. The aligning and supplying apparatus 4 is structured such that a conveyed article 11, for example, a small article, in this case, a tablet revolves around a turn table 10. The conveyed article 11 is aligned along a peripheral edge portion of the turn table 10 by an aligning guide (not shown). The article is linearly fed by a width guide 15 (mentioned below) arranged near the peripheral edge portion of the turn table 10 with a slight gap so as to be supplied to the rotary disc portion 5.

The inspection portion 2 has two side surface inspecting portions 12 for individually inspecting both side surfaces of the conveyed article 11 on the rotary disc portion 5, a front surface inspecting portion 13 for inspecting a front surface of the conveyed article 11 on the first conveying portion 6, and a back surface inspecting portion 14 for inspecting a back surface of the conveyed article 11 appearing upside on the second conveying portion 7. For example, the inspection section 2 can be a light source illuminating the conveyed article 11 and a television camera picking up an image of the conveyed article 11 applied to each of the structures in the inspection portion 2 (for example, Japanese Patent Application Publication No. 6-088656).

The sorting portion 3 sorts the conveyed article 11 in response to data obtained from the inspection section 2. The data obtained from the inspecting portion 2 is fed to a control means, for example, an analyzer or the like, to be compared with reference data. An analysis for obtaining an acceptable article data or a defective article data is executed and the data is transmitted to the sorting portion 3. The time that the sorted article 11 arrives at the sorting portion 3 is taken by counting the conveyed article 11 passing through the inspection portion 2, and the conveyed article 11 is divided into an acceptable article collecting duct and a defective article collecting duct. The conveyed article 11 is sorted using a blowing device such as an air pressure device incorporated in the sorting portion 3 in response to the results obtained from the inspection portion 2.

Figure 2:
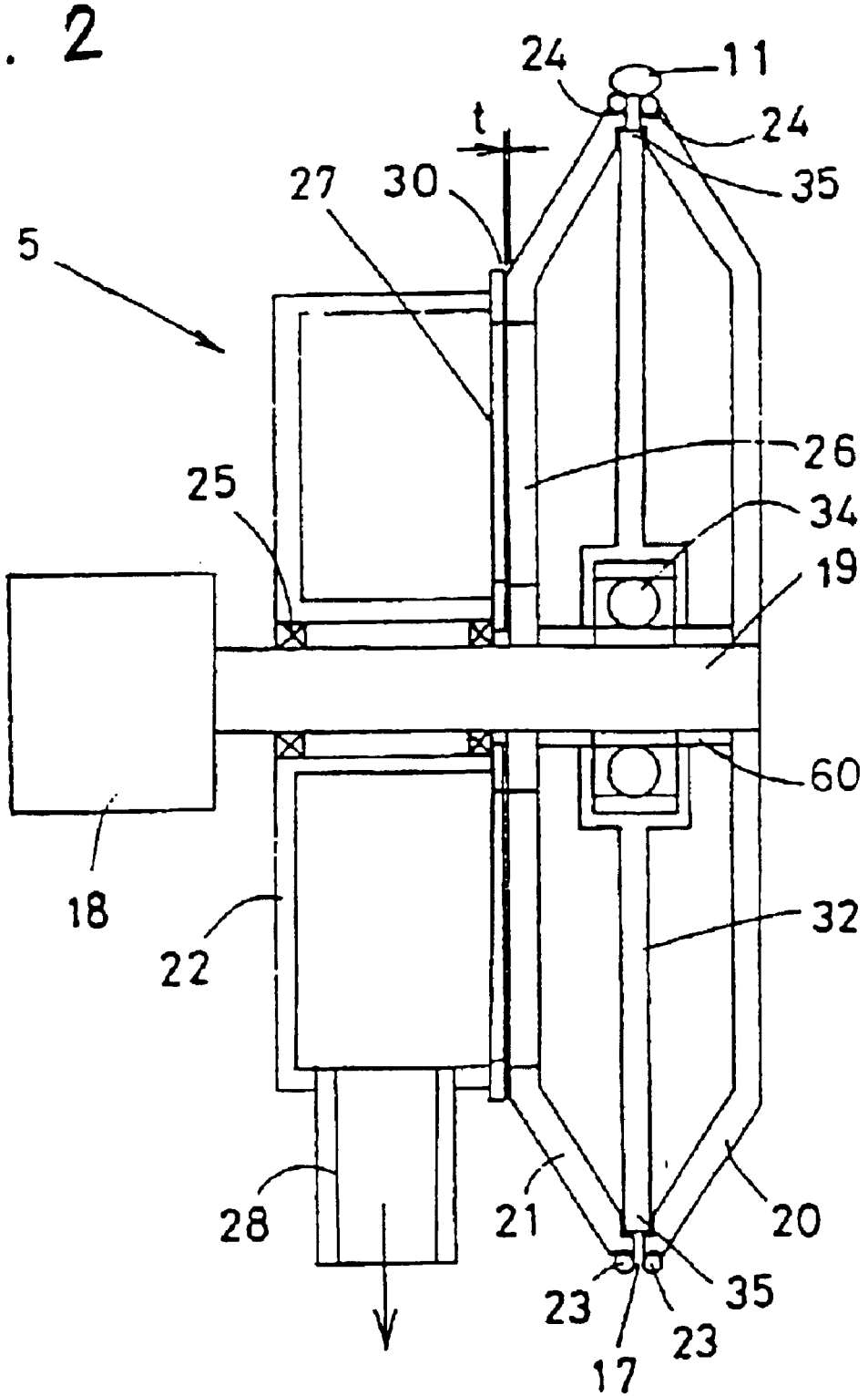
FIG. 2 is a cross sectional view of a rotary disc portion.

FIG. 2 shows a cross section of the rotary disc portion 5 having a suctioning device. The rotary disc portion 5 includes a pair of parallel rotating plates 20 and 21 having a region defined between them. A gap is formed on one side of the region between the plates and a slit 17 formed on the other side of the region between the plates members. A suctioning device 22 is disposed on an outer surface of at least one of the plates to secure the article 11 on the outer peripheral surfaces of the plates by extracting air from the groove. In the embodiment, the structure further includes a motor 18 and a drive shaft 19 of the motor 18 on which the parallel rotating plates 20 and 21 are mounted.

The parallel rotating plates 20 and 21 are opposing each other so that peripheral edges of the parallel rotating plates 20 and 21 are close to each other. The slit is formed between the plates, for example, using plate-like discs, and a fixed suction duct 22 is rotatably mounting the drive shaft 19 of the motor 18. The pair of parallel rotating plates 20 and 21 is mounted to a tubular connecting member 60 fitted to the drive shaft 19 so as to determine an interval of the slit 17.

A ring-like supporting member 23 having a high coefficient of friction is provided in both sides of the slit 17 along the outer peripheral surfaces of the parallel rotating plates 20 and 21. In the embodiment, a peripheral groove 24 is formed in each of the outer peripheral edges of the parallel rotating plates 20 and 21, wherein the supporting member 23 has a large friction coefficient. For example, an O-ring made of a material having an adhesive property and a buffering property, for example, rubber or the like is attached thereto, and an interval of the slit 17 between the O-rings is set to be smaller than a size of the conveyed article 11, for example, about 1 mm.

The suction duct 22 is mounted to the drive shaft 19 of the motor 18 via a bearing 25 which moves the suction duct 22 close to one rotating plate 21 so as to form a gap 30 at an interval t, for example, about 0.5 mm. Sucking holes 26 and 27 respectively communicating with opposing portions thereof. The suction duct 22 is provided with a sucking connection portion 28 on a side surface of the suction duct 22, and connects a known suction device (not shown) to the sucking connection portion 28. Accordingly, when taking out air within the suction duct 22 by operating the suction device, the space between a pair of parallel rotating plates 20 and 21 experience a negative pressure through the sucking holes 26 and 27. Thus, the air is sucked from the slit 17 between the rotating plates 20 and 21.

At this time, the gap 30 between the suction duct 22 and the rotating plate 21 achieves a seal effect due to a pressure loss of a fine interval. When mounting the conveyed article 11 such as the tablet or the like on the supporting member 23, the conveyed article 11 is held by suctioning of the conveyed article to the supporting member 23 due to an air pressure, and when the rotating plates 20 and 21 rotate in correspondence to the rotation of the motor 18, the conveyed article 11 moves around the circumference of the rotating plates 20 and 21 in connection with the rotation of the rotating plates 20 and 21. Accordingly, the conveyed article 11 is released from the rotary disc portion 5 by the aligning and supplying apparatus 4 as shown in FIG. 1. The article 11 then passes through side surface inspection portion 12 for inspection while being held by suction by the slit 17, and is conveyed toward the first conveying portion 6.

Reference numeral 32 denotes an air shutting device. The air shutting device 32 closes the slit 17 of the peripheral surface portion 33 other than a peripheral surface portion reaching the first conveying portion 6 from the aligning and supplying apparatus 4 in the rotational direction of the rotary disc portion 5. In the embodiment, a center portion thereof is supported to the drive shaft 19 of the motor 18 via the bearing 34 and a peripheral edge portion 35 is positioned so as to close the slit 17 of the peripheral surface portion 33.

Figure 3:
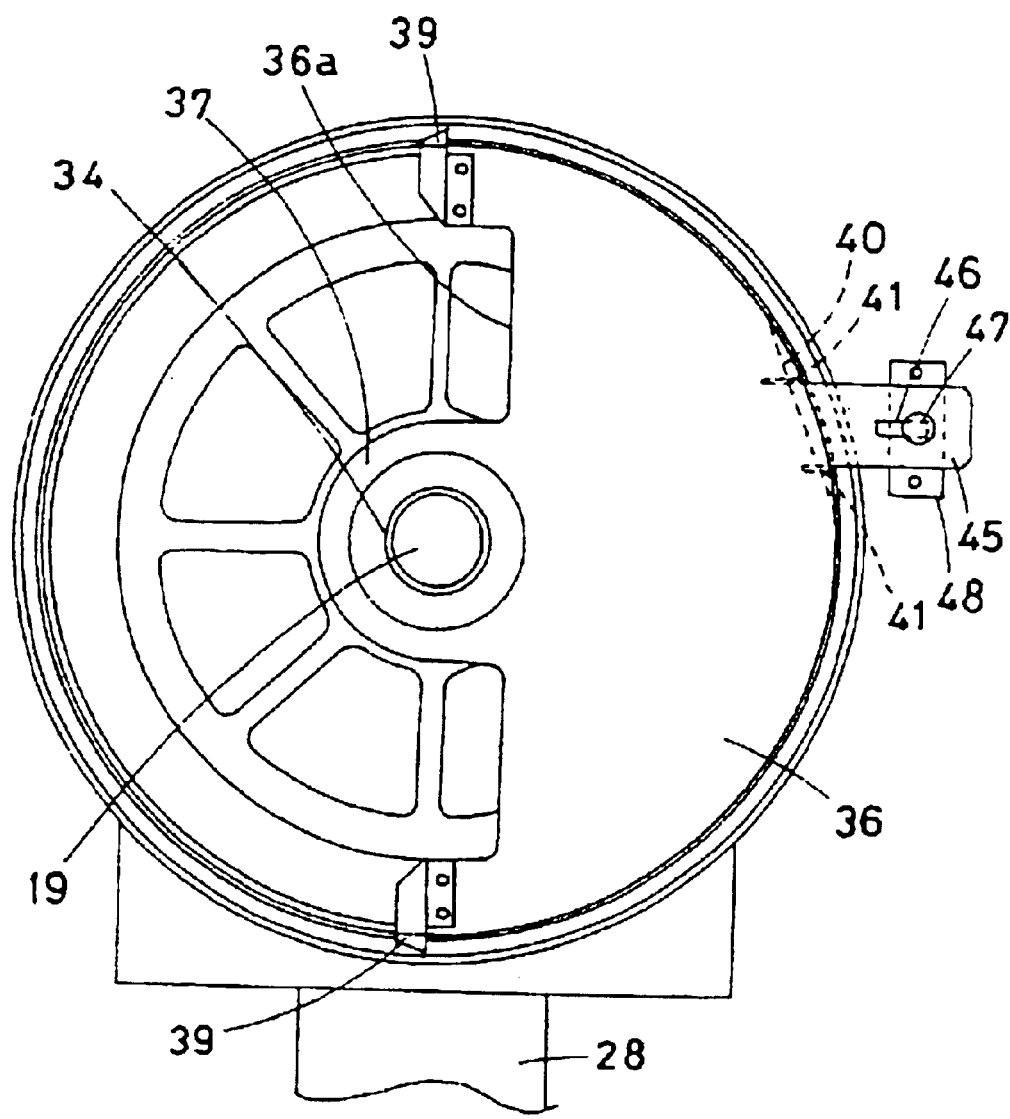
FIG. 3 is a front elevational view of a state that one of rotary discs is taken out.

FIG. 3 shows an air shutting device 32. The air shutting device 32 is formed of a substantially meniscus-shaped disc 36 and a semicircular protruding portion 37 is provided in a center portion of a flat portion 36. The bearing 34 is provided in the protruding portion 37, and the bearing 34 is fitted to the drive shaft 19 of the motor 18, whereby the disc 36 is supported to the drive shaft 19. A wind guide 39 for obliquely guiding the air at a position of the slit 17 is provided at both ends of the flat portion 36a of the disc 36.

Further, a fixed plate receiving groove 40 is formed in a part of a circumferential portion of the disc 36. A pair of fixed pins 41 is provided within the fixed plate receiving groove 40 in a standing manner. A front end of a fixed plate 45 having a thickness of about 0.5 mm is inserted and attached within the fixed plate receiving groove 40 between the fixed pins 41 through the slit 17. A long hole 46 longer in an inserting direction is formed at a rear end of the fixed plate 45. A fixing means inserted to the long hole 46, for example, a thumb screw 47 is fastened to one end of a fixed member 48. The fixed plate 45 is fixed to a vertical base 49 (FIG. 5) via the fixed member 48 so as to be adjustable. Accordingly, the air sucked by the suction device and moving forward from the slit 17 is limited to a portion of the rotating plates 20 and 21 where the disc 36 does not exist. In this case, one of the wind guides 39 faces the aligning and supplying apparatus 4.

Figure 4:
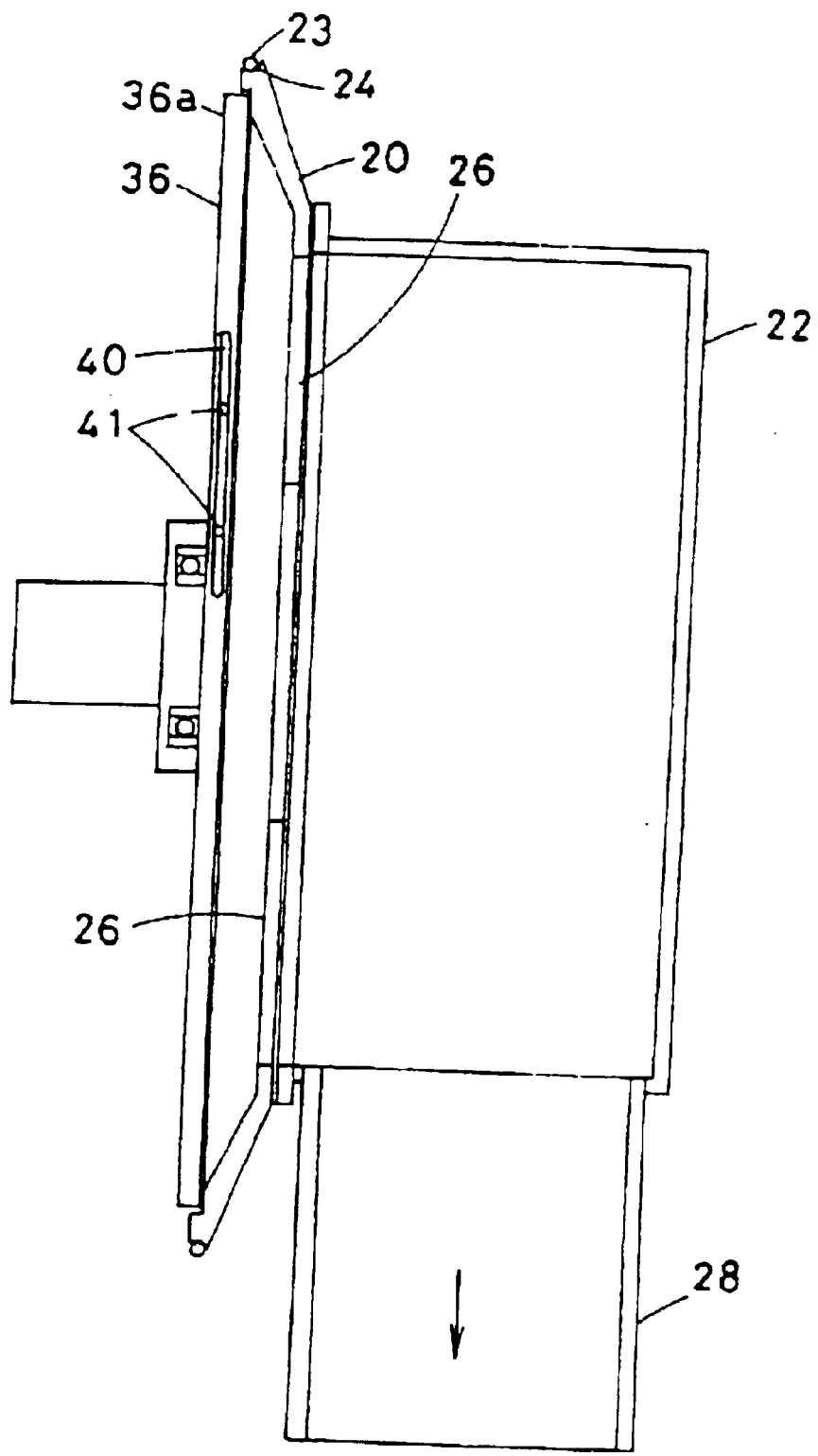
FIG. 4 is a cross sectional view of the state shown in FIG. 3.

FIG. 4 shows the groove 40 and the pin 41 to which the fixed plate 45 of the disc 36 is inserted.

Figure 5:
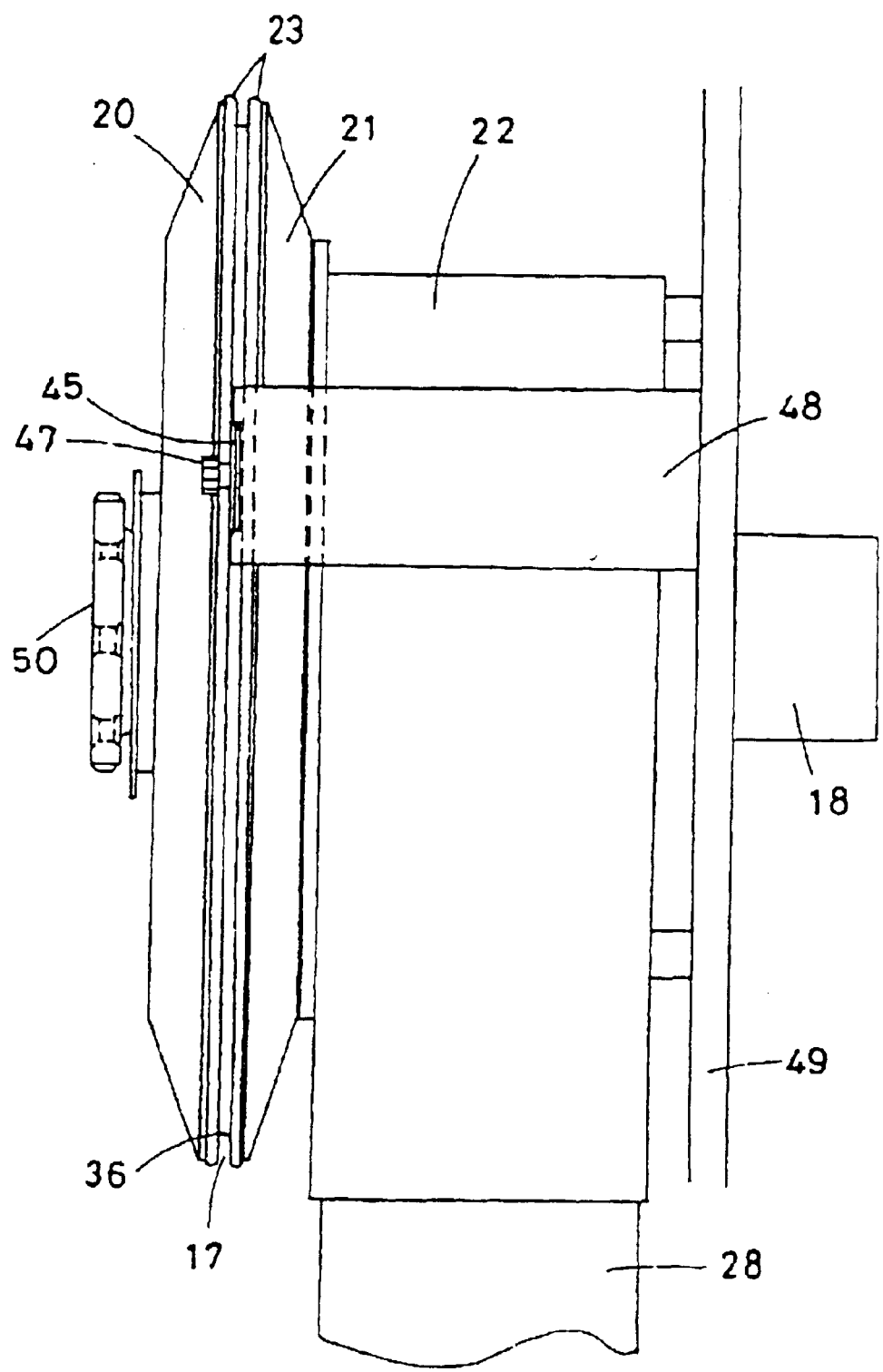
FIG. 5 is a side elevational view of the rotary disc portion.

FIG. 5 shows a state that another end of the fixed member 48 is mounted to the vertical base 49 to which the motor 18 is mounted, and the fixed plate 45 is fixed to one end of the fixed member 48 by the thumb screw 47. Reference numeral 50 denotes a fixing device for fixing the rotating plate 20 to the tubular connection member 60 (FIG. 2).

Figure 6:
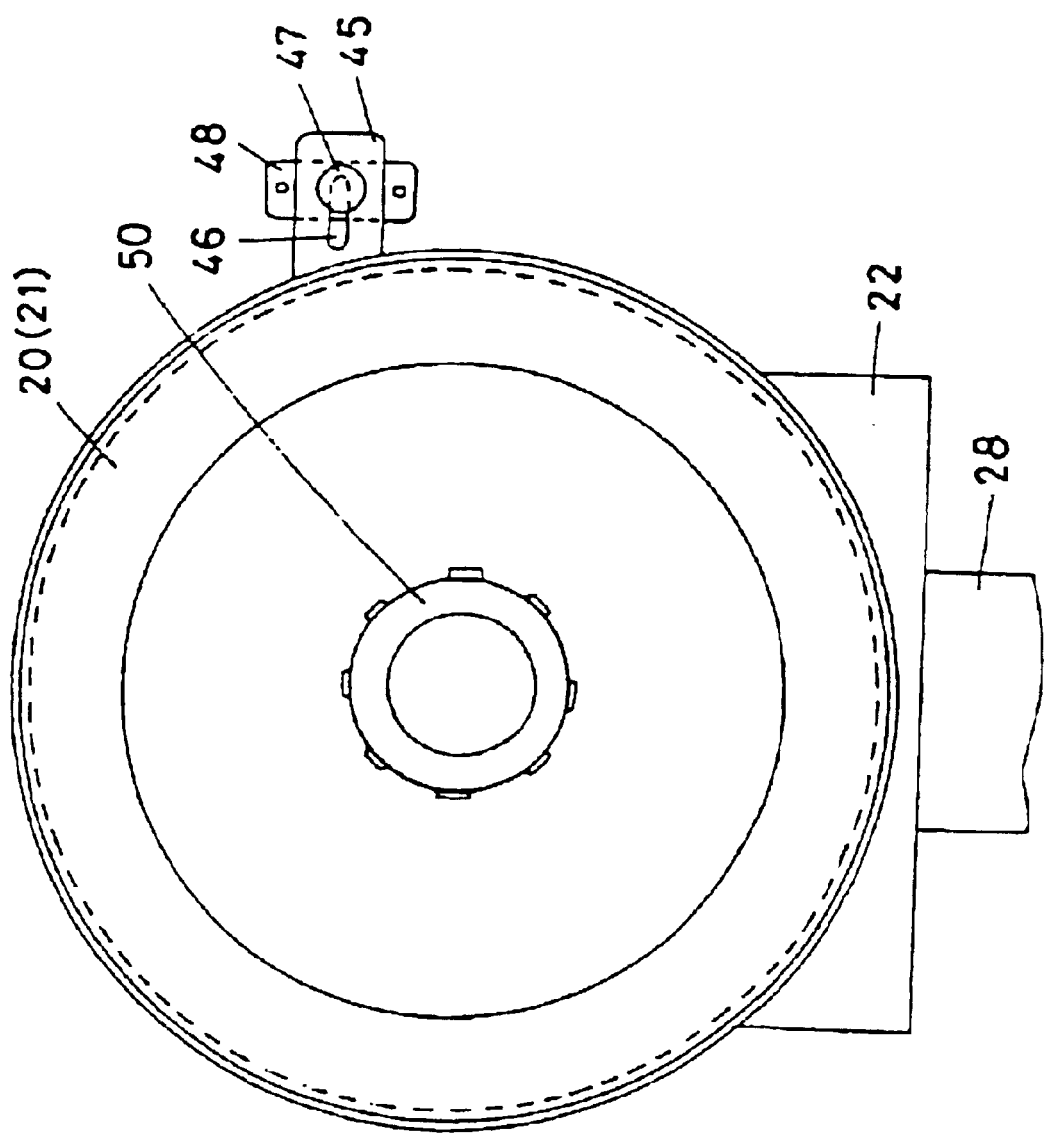
FIG. 6 is a front elevational view of the rotary disc portion.

FIG. 6 is a front elevational view of the rotating plates 20 and 21. The linear conveying portion 8 including the suctioning device maintains the position of the conveyed article 11 riding over a pair of parallel conveying belts 52 through the gap between the conveying belts 52 as shown in FIG. 1, by extracting air thereby holding the conveyed article 11 by suction to the conveying belt 52. One end of the conveying belts 52 opposes the outer peripheral surface of the rotary disc portion 5 so as to transfer the conveyed article 11. This linear conveying portion 8, as shown in FIG. 1, includes the first conveying portion 6 and the second conveying portion 7 having the same structure, one end of the first conveying portion 6 opposes to another of the wind guide 39 on the outer peripheral surface of the rotary disc portion 5 so as to transfer the conveyed article 11, and one end of the second conveying portion 7 opposes to another end of the first conveying portion 6 so as to transfer the conveyed article 11.

Reference numerals 6a, 6b, 7a and 7b denote a ring body winding the conveying belt 52 there around, for example, a pulley or the like. The ring bodies 6a, 6b, 7a and 7b connect one of the first conveying portion 6 and the second conveying portion 7 to a rotation driving means. The known structure is applied to the linear conveying portion 8 (for example, Japanese Patent Application Publication No. 5-065405).

Further, as shown in FIG. 1, the aligning and supplying apparatus 4 for aligning the conveyed article 11 so as to supply to the outer peripheral surface of the rotary disc portion 5 is positioned in an opposite side of the rotary disc portion 5 to the first conveying portion 6.

Figure 7:
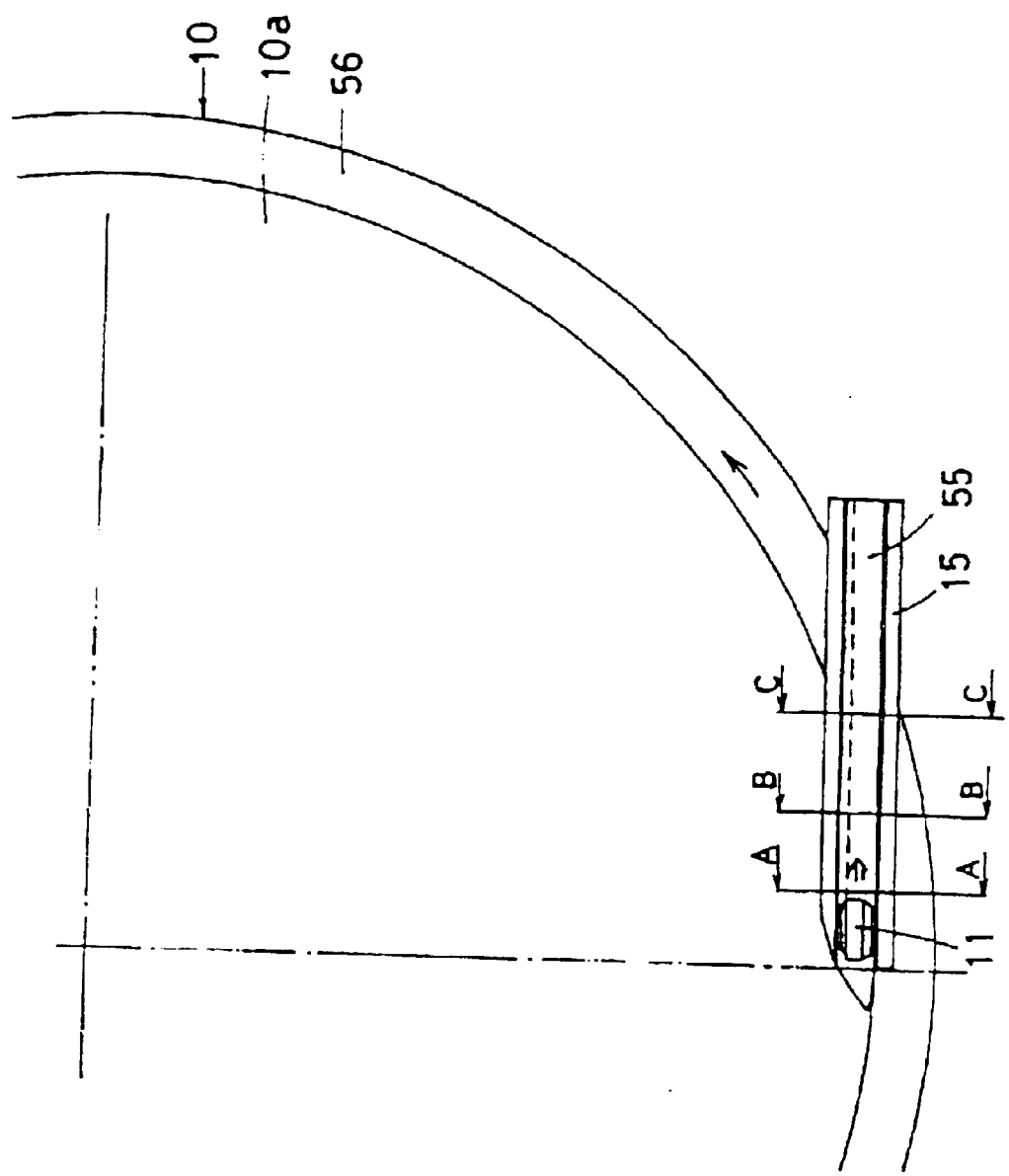
FIG. 7 is a partly plan view of an aligning and supplying apparatus.
Figure 8:
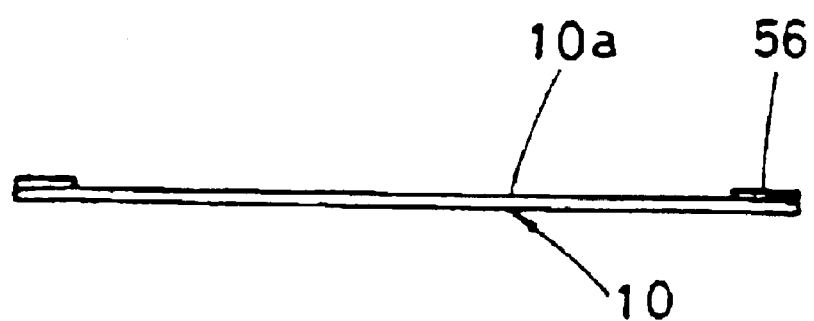
FIG. 8 is a cross sectional view of a turn table of the aligning and supplying apparatus shown in FIG. 7.

FIGS. 7 and 8 are views showing details of the aligning and supplying apparatus 4 (in this case, a rotational direction of the turn table 10 is set to be opposite to FIG. 1). The aligning and supplying apparatus 4 is structured, for example, such as aligning the conveyed article 11 having different thicknesses T and widths W (refer to FIG. 10) and capable of setting the thickness or the width of the conveyed article 11 in the vertical direction. For example, a tablet has a width of about 6 mm, a thickness of about 5 mm and a length longer than the width or the length. The aligning and supplying apparatus 4 includes turn table 10, width guide 15, a thickness gate 55, an aligning guide (not shown) and a peripheral wall (not shown). The turn table 10 is structured such that a sheet having a thickness of about 0.5 mm is adhered to its mounting surface 10a, and a step portion 56 having a predetermined height is provided along a peripheral edge of the mounting surface 10a. The step portion 56 is structured, as shown in FIG. 8, such that a sheet, for example, having a thickness of about 0.5 mm is adhered to an outer periphery.

The aligning guide employs a known means, and is structured such as to align the conveyed article 11 mounted on the mounting surface 10a so as to be along the peripheral edge portion of the turn table 10.

The peripheral wall (not shown) is arranged in the peripheral edge portion of the turn table 10 with a slight gap, and is structured such as to prevent the conveyed article 11 on the turn table 10 from moving out of the turn table 10 from the portion other than the width guide 15.

The width guise 15 crosses to the step portion 56 so as to guide the conveyed article 11 mounted on the mounting surface 10a to the outer peripheral side from the center side due to the rotation of the table 10, for example, linearly, one end is positioned close to a center side of the turn table rather than the step portion 56, and another end protrudes outward from the outer periphery of the step portion 56 so as be fixed (the fixing means is not shown). The width of the width guide 15 in accordance with the embodiment is set to a size capable of guiding the conveyed article 11 when the width and the thickness of the conveyed article 11 are set to the vertical direction, and the conveyed article 11 aligned by the aligning guide is introduced within the width guide 15.

FIGS. 9 and 10 illustrate an operation within the width guide 15 and the thickness gate 55. FIGS. 9A and 10A show a cross section along a line A—A in FIG. 7, FIGS. 9B and 10B show a cross section along a line B—B in FIG. 7, and FIGS. 9C and 10C show a cross section along a line C—C in FIG. 7. The thickness gate 55 is arranged in an upper side of the conveyed article 11 passing within the width guide 15 on the turn table 10, and has a projection portion 57 protruding toward the conveyed article 11. The projection portion 57 along with step portion 56 are used to rotate the conveyed article 11 when the conveyed article 11 is positioned such that its width is oriented in the vertical direction. In the embodiment, the thickness gate 55 is set to a height at which the conveyed article 11 can enter within the width guide 15 even when the conveyed article is positioned such that its width is oriented in the vertical direction, and the projection portion 57 is provided in one side of the width guide 15, that is, an opposite side to a side from which the step portion 56 progressively enters, so as to protrude such a degree as to contact with a side surface at an upper end of the conveyed article 11, thereby rotating the conveyed article 11 such that its thickness is oriented in the vertical direction.

FIGS. 9A, 9B and 9C show a state in which the conveyed article 11 is positioned such that its width is oriented in the vertical direction, that is, the tablet is mounted on the turn table 10 by setting the width direction to the vertical direction, and FIG. 9A shows a state in which the conveyed article 11 is introduced within the thickness gate 55 and the width guide 15. FIG. 9B shows a state in which the step portion 56 moves forward to about half in the horizontal direction so as to press the side portion of the conveyed article 11 while the conveyed article 11 moves along one side wall of the width guide 15 due to the rotation of the turn table 10, whereby the upper end side surface of the conveyed article 11 is brought into contact with the projection portion 57 so as to be tilted. FIG. 9C shows a state in which the step portion 56 completely enters within the width guide 15. At this time, the conveyed article 11 sits on top of the step portion 56, and the conveyed article 11 rotates such that its thickness is set to the vertical direction. Thereafter, as shown in FIG. 7, the conveyed article 11 further moves along the width guide 15, drops down from the peripheral edge portion of the turn table 10 and drops down on the slit 17 of the rotary disc portion 5 so as to be held by suction.

FIGS. 10A, 10B and 10C show a state in which the conveyed article 11 is positioned such that its thickness is oriented in the vertical direction, that is, the conveyed article 11 is mounted on the turn table 10 by setting the thickness direction to the vertical direction, and FIG. 10A shows a state in which the conveyed article 11 is introduced within the thickness gate 55 and the width guide 15. FIG. 10B shows a state in which the step portion 56 moves forward to about half in the horizontal direction so as to press the side portion in the mounting side of the conveyed article 11 while the conveyed article 11 moves along one side wall of the width guide 15 due to the rotation of the turn table 10, whereby the conveyed article 11 is going to sit on top of the step portion 56. At this time, since the conveyed article 11 has a size not being brought into contact with the side surface of the upper end portion of the conveyed article 11 as mentioned above, the conveyed article 11 is not tilted while being brought into contact with one side wall of the width guide 15, and even when it is going to be tilted, the upper end surface of the conveyed article 11 is brought into contact with the lower surface of the projection portion 57 so as to prevent the conveyed article 11 from being tilted. FIG. 10C shows a state in which the step portion 56 completely enters within the width guide 15. At this time, the conveyed article 11 sits on top of the step portion 56. The later operations are the same as those described in FIG. 9, and in any case, the conveyed article 11 drops down to the peripheral edge portion of the rotary disc portion so as to be held by suction by setting the thickness T to the vertical direction.

In accordance with this embodiment, since the apparatus includes the rotary disc portion 5 and the linear conveying portion 8, it is possible to stably convey with saving a space even when arranging the linear conveying portion 8 horizontally, and it is possible to execute the side surface inspection of the conveyed article 11 conveyed on the rotary disc 5.

As is different from the conveying belt 52 of the linear conveying portion 8, since it is possible to fix the supporting member 23 to the peripheral edge of the rotary disc portion 5 and it is possible to reduce the cross sectional area of the supporting member 23, it is possible to stably inspect the conveyed article 11 without working against the side surface inspection of the conveyed article 11 and without slipping the conveyed article 11. In particular, when the supporting member 23 includes a structure having a buffering property and an adhesive property, for example, an O-ring, it is possible to convey at a high speed and stably.

It is possible to inspect both of the front and back surfaces of the conveyed article 11 by the linear conveying portion 8.

It is possible to shut the air in the portion of the slit 17 requiring no suction in the rotary disc 5. Accordingly, it is possible to save the amount of air suctioning and the working capacity of the blower. Also, energy can be saved.

It is possible to inspect each of the side surfaces and both of the front and back surfaces of the conveyed article 11. It is also possible to sort the conveyed articles according to the results obtained from the inspection portions of the apparatus.

It is possible to align all the small articles having different widths W and thicknesses T and stabilizing under the turned state in the low attitude, and it is not necessary to sort, so that it is possible to improve a processing efficiency.

In accordance with the conveying apparatus described in the first aspect of the present invention, since the apparatus includes a rotary disc portion and the linear conveying portion, it is possible to stably convey articles without requiring a lot of space even when the linear conveying portion is arranged horizontally. It is also possible to execute a side surface inspection of the conveyed article conveyed on the rotary disc. In accordance with the conveying apparatus described in the second aspect of the present invention, in addition to the same effects as that of the first aspect, it is possible to fix the supporting member to the peripheral edge of the rotary disc portion being different from the conveying belt in the linear conveying portion and it is possible to make a cross sectional area of the supporting member small, so that it is possible to stably inspect the conveyed article without working against the side surface inspection of the conveyed article and without slipping the conveyed article. In particular, when the supporting member includes a structure having a buffering property and an adhesive property, for example, an O-ring, it is possible to convey at a high speed and stably.

In accordance with the conveying apparatus described in the third aspect, in addition to the same effects as that of the second aspect, it is possible to inspect both the front and back surfaces of the conveyed article by the linear conveying portion.

In accordance with the conveying apparatus described in the fourth aspect, in addition to the same effect as that of the third aspect, it is possible to shut the air of the slit requiring no suction in the rotary disc. Accordingly, it is possible to save the amount of air suctioning provided and blower capacity used as well as save energy.

In accordance with the inspecting apparatus described in the fifth aspect, in addition to the same effects as that of the first aspect, the second aspect, the third aspect or the fourth aspect, it is possible to inspect the side surface and both the front and back surfaces of the conveyed article, and it is possible to sort in response to the inspected results.

In accordance with the aligning and supplying apparatus described in the sixth aspect, it is possible to align all the small articles having different widths and thicknesses and stabilizing under the turned state in a low attitude, and it is not necessary to sort, so that it is possible to improve the processing efficiency.

What is claimed is:

1. An aligning and supplying apparatus for mounting a conveyed article having different thickness and width and capable of being stably mounted by setting a thickness direction or a width direction to a vertical direction, respectively, comprising:
   a turn table in which a step portion having a predetermined height is provided along a peripheral edge of a mounting surface;
   a width guide crossing to said step portion in such a manner as to guide said conveyed article mounted on said mounting surface from a center side to an outer peripheral side due to a rotation of said turn table, having one end positioned at the center side of said turn table rather than said step portion and having another end protruding outward from the outer periphery of said step portion so as to be fixed; and
   a thickness gate arranged in an upper side of said conveyed article passing within said width guide on said turn table, and having a projection portion protruding toward said conveyed article so as to be capable of getting down said conveyed article in a high attitude on said step portion without getting down said conveyed article in a low attitude at a time when said conveyed article moving along said width guide due to the rotation of said turn table rides over said step portion.

2. The aligning and supplying apparatus according to claim 1 further comprising a conveying apparatus comprising:
   a rotary disc portion having a pair of parallel plate members with a region defined there between.

3. The aligning and supplying apparatus according to claim 2 further comprising a gap formed on the region between the pair of parallel plate members.

4. The aligning and supplying apparatus according to claim 3 further comprising a first suctioning device disposed to secure the article on the outer peripheral surfaces of the pair of parallel plate members by extracting air from the gap.

5. The aligning and supplying apparatus according to claim 4 further comprising a linear conveying portion having a pair of parallel conveying belts with a gap formed there between, the linear conveying portion being in communication with the rotary disc portion to transfer the article from the rotary disc portion to the linear conveying portion.

6. The aligning and supplying apparatus according to claim 5 further comprising a second suctioning device provided between the pair of parallel conveying belts.

7. The aligning and supplying apparatus according to claim 5 further comprising a side surface inspection portion for inspecting a side surface of the article.

8. The aligning and supplying apparatus according to claim 5, wherein the linear conveying portion includes a first conveying portion and a second conveying portion, one end of the first conveying portion in communication with the outer peripheral surfaces of the pair of parallel plate members so as to transfers the article, and one end of the second conveying portion in communication with the other end of the first conveying portion so as to further transfer the article.

9. The aligning and supplying apparatus according to claim 5 further comprising supporting members positioned in the pair of parallel plate members to hold the article in place such that the article transfers to the linear conveying portion.

10. The aligning and supplying apparatus according to claim 9, wherein the supporting members have a large coefficient of friction.

11. The aligning and supplying apparatus according to claim 9, wherein the pair of parallel plate members includes grooves provided around the peripheral surface of each of the parallel plate members.

12. The aligning and supplying apparatus according to claim 9, wherein the supporting members are made of rubber.

13. A conveying apparatus comprising:
   a rotary disc portion having a pair of parallel plate members with a region defined there between;
   a gap formed on the region between the pair of parallel plate members;
   a first suctioning device disposed to secure an article on the outer peripheral surfaces of the pair of parallel plate members by extracting air from the gap;
   a linear conveying portion having a pair of parallel conveying belts with a gap formed there between, the linear conveying portion being in communication with the rotary disc portion to transfer the article from the rotary disc portion to the linear conveying portion; and
   supporting members positioned in the pair of parallel plate members to hold the article in place such that the article transfers to the linear conveying portion, wherein the supporting members have a large coefficient of friction.

14. The conveying apparatus according to claim 13, wherein the pair of parallel plate members includes grooves provided around the peripheral surface of each of the parallel plate members.

15. The conveying apparatus according to claim 13, wherein the supporting members are made of rubber.

16. The conveying apparatus according to claim 13, further comprising a second suctioning device provided between the pair of parallel conveying belts.

17. The conveying apparatus according to claim 13, further comprising a side surface inspection portion for inspecting a side surface of the article.

18. The conveying apparatus according to claim 13, wherein the supporting members have a buffering property.

19. The conveying apparatus according to claim 13, wherein the supporting members including an O-ring.

20. The conveying apparatus according to claim 13, wherein the linear conveying portion includes a first conveying portion and a second conveying portion, one end of the first conveying portion in communication with the outer peripheral surfaces of the pair of parallel plate members so as to transfers the article, and one end of the second conveying portion in communication with the other end of the first conveying portion so as to further transfer the article.

21. The conveying apparatus according to claim 20 further comprising a means for aligning and supplying the article to the outer peripheral surfaces of the pair of parallel plate members,
   the means for aligning and supplying being positioned opposite the first conveying portion,
   wherein the rotary disc portion is disposed between the means for aligning and supplying and the first conveying portion.

22. The conveying apparatus according to claim 21, wherein the means for aligning and supplying includes a turntable and a width guide.

23. The conveying apparatus according to claim 20 further comprising;
   a front surface inspection portion for inspecting a front surface of the article conveyed on the first conveying portion;
   a back surface inspection portion for inspecting a back surface of the article conveyed on the second conveying portion; and
   a sorting portion for sorting the article.

24. The conveying apparatus according to claim 23, wherein the article is sorted in response to results obtained from the front surface inspection portion, the back surface inspection portion or the side surface inspection portion.

25. A conveying apparatus comprising:
   a rotary disc portion having a pair of parallel plate members with a region defined there between;
   a gap formed on the region between the pair of parallel plate members;
   a first suctioning device disposed to secure an article on the outer peripheral surfaces of the pair of parallel plate members by extracting air from the gap;
   a linear conveying portion having a pair of parallel conveying belts with a gap formed there between, the linear conveying portion being in communication with the rotary disc portion to transfer the article from the rotary disc portion to the linear conveying portion; and
   an air shutting device positioned between the pair of parallel plate members and forming the slit, the air shutting device having a solid portion for preventing air suctioning.

26. A method for conveying an article comprising:
   providing an article on a rotary disc portion having a pair of parallel plate members with a region defined there between, with a gap formed on one side of the region between the pair of parallel plate members;
   securing the article on outer peripheral surfaces of the pair of parallel plate members by extracting air from the gap;
   guiding the article onto a linear conveying portion having a pair of parallel conveying belts with a gap formed there between, the linear conveying portion being in communication with the rotary disc portion to transfer the article from the rotary disc portion to the linear conveying portion;
   providing supporting members positioned in the pair of parallel plate members to hold the article in place such that the article transfers to the linear conveying portion, wherein the supporting members have a large coefficient of friction; and providing grooves provided around the peripheral surface of each of the parallel plate members.

27. The method for conveying according to claim 26, further comprising positioning supporting members in the grooves of the pair of parallel plate members to hold the article in place such that the article transfers to the linear conveying portion.

28. The method for conveying according to claim 26, further comprising inspecting a side surface of the article.

29. The method for conveying according to claim 26, further comprising aligning and supplying the article to the outer peripheral surfaces of the pair of parallel plate members.

30. The method for conveying according to claim 26, further comprising:

inspecting a front surface of the article conveyed;

inspecting a back surface of the article conveyed; and sorting the article.

31. A method for conveying an article comprising:

providing an article on a rotary disc portion having a pair of parallel plate members with a region defined there between, with a gap formed on one side of the region between the pair of parallel plate members;

securing the article on outer peripheral surfaces of the pair of parallel plate members by extracting air from the gap;

guiding the article onto a linear conveying portion having a pair of parallel conveying belts with a gap formed there between, the linear conveying portion being in communication with the rotary disc portion to transfer the article from the rotary disc portion to the linear conveying portion; and positioning supporting members of the pair of parallel plate members to hold the article in place such that the article transfers to the linear conveying portion, wherein the supporting members have a large coefficient of friction.

32. The method according to claim 31, wherein the supporting members are made of rubber.

33. The method according to claim 31, wherein the supporting members have a buffering property and an adhesive property.

34. The method according to claim 31, wherein the supporting members include an O-ring.

35. A method for conveying an article comprising:

providing an article on a rotary disc portion having a pair of parallel plate members with a region defined there between, with a gap formed on one side of the region between the pair of parallel plate members;

securing the article on outer peripheral surfaces of the pair of parallel plate members by extracting air from the gap;

guiding the article onto a linear conveying portion having a pair of parallel conveying belts with a gap formed there between, the linear conveying portion being in communication with the rotary disc portion to transfer the article from the rotary disc portion to the linear conveying portion; and positioning supporting members of the pair of parallel plate members to hold the article in place such that the article transfers to the linear conveying portion, wherein the supporting members have a buffering property.

36. A method for conveying an article comprising:

providing an article on a rotary disc portion having a pair of parallel plate members with a region defined there between, with a gap formed on one side of the region between the pair of parallel plate members;

securing the article on outer peripheral surfaces of the pair of parallel plate members by extracting air from the gap;

guiding the article onto a linear conveying portion having a pair of parallel conveying belts with a gap formed there between, the linear conveying portion being in communication with the rotary disc portion to transfer the article from the rotary disc portion to the linear conveying portion; and positioning supporting members of the pair of parallel plate members to hold the article in place such that the article transfers to the linear conveying portion, wherein the supporting members have an adhesive property.

37. A conveying apparatus comprising:

a rotary disc portion having a pair of parallel plate members with a region defined there between;

a gap formed on the region between the pair of parallel plate members;

a first suctioning device disposed to secure an article on the outer peripheral surfaces of the pair of parallel plate members by extracting air from the gap;

a linear conveying portion having a pair of parallel conveying belts with a gap formed there between, the linear conveying portion being in communication with the rotary disc portion to transfer the article from the rotary disc portion to the linear conveying portion; and supporting members positioned in the pair of parallel plate members to hold the article in place such that the article transfers to the linear conveying portion, wherein the supporting members have an adhesive property.

38. A conveying apparatus comprising:

a rotary disc portion having a pair of parallel plate members with a region defined there between;

a gap formed on the region between the pair of parallel plate members;

a first suctioning device disposed to secure an article on the outer peripheral surfaces of the pair of parallel plate members by extracting air from the gap;

a linear conveying portion having a pair of parallel conveying belts with a gap formed there between, the linear conveying portion being in communication with the rotary disc portion to transfer the article from the rotary disc portion to the linear conveying portion; and supporting members positioned in the pair of parallel plate members to hold the article in place such that the article transfers to the linear conveying portion, wherein the supporting members have a buffering property and an adhesive property.

* * * * *